J. W. GILLIE.
DEPTH RECORDER.
APPLICATION FILED JUNE 25, 1908.
928,191.  Patented July 13, 1909.
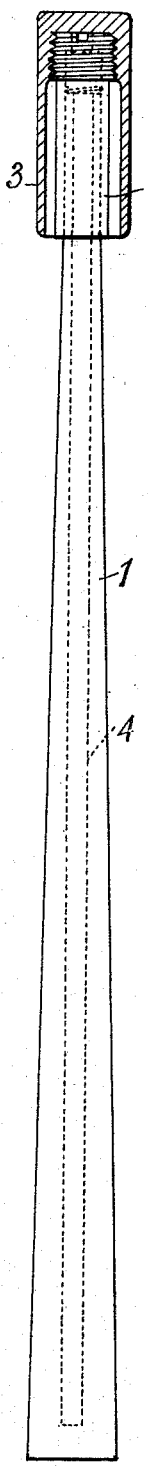
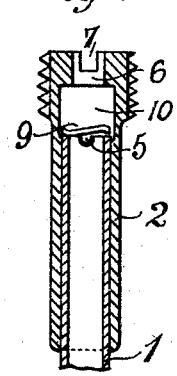
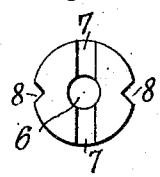
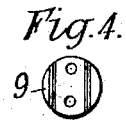
Witnesses:
L. E. Barkley.
L. A. Sands.
Inventor:
John Wilson Gillie,
by James A. Akkerman
atty.

UNITED STATES PATENT OFFICE.

JOHN WILSON GILLIE, OF NORTH SHIELDS, ENGLAND.

DEPTH-RECORDER.

No. 928,191.      Specification of Letters Patent.      Patented July 13, 1909.

Application filed June 25, 1908. Serial No. 440,345.

*To all whom it may concern:*

Be it known that I, JOHN WILSON GILLIE, a subject of the King of the United Kingdom of Great Britain and Ireland, residing at The New Quay, North Shields, Northumberland, England, have invented a new and useful Improved Depth-Recorder, of which the following is a specification.

The present invention relates to a depth-recorder or sounding apparatus of the well-known type in which the quantity of water which has penetrated into a vessel serves as a measure for the depth to which said vessel has been lowered into the water. Devices of this type in which both the air and water are retained in the vessel suffer from the defect that it is necessary to use some kind of valve which is subjected to considerable pressure while the vessel is being raised to the surface and which is therefore difficult to keep in good working condition. On the other hand devices of this type in which the air is allowed to escape out of the vessel while the latter is being raised suffer from the defect that some of the water escapes together with the air so that the depth is incorrectly indicated. The use of valves which act as non-return valves as far as the water is concerned and particulraly the use of such valves comprising rubber, in this latter class of device has been found objectionable, bacause the valves readily get out of order on account of the apparatus being used at very irregular intervals.

The present invention relates in particular to that class of device in which the measuring vessel is provided with a channel serving during the descent of the recorder as an entrance channel for the water, and during the ascent as an exit channel for the air, the object of the invention being to prevent the water from escaping without using such non-return valves for this purpose.

The present invention consists in arranging permanently and directly in the air exit channel non-submergible baffling means (that is, a baffling arrangement which cannot be entirely covered or surrounded by water when the tube is tilted in use) which baffle the escaping air and any water carried therewith and deflect such water back into the vessel while permitting the air to escape. The present invention also possesses the advantage that if desired the water may be emptied from the vessel when required by shaking it out through the air exit channel.

One form of the depth-recorder according to the present invention is illustrated by way of example in the accompanying drawing in which:—

Figure 1 shows the vessel, which is in the form of a measuring tube, in side elevation provided with its cap in section, Fig. 2 a longitudinal section of the top portion of the measuring tube, Fig. 3 a plan of the head of the measuring tube, and Fig. 4 a plan of the member serving as a baffling-means.

The measuring tube 1 consists suitably of a tapering tube of celluloid or xylonite or the like provided at its end with a brass head 2 which screws into the brass tubular cap 3. Inside the measuring tube 1 a scale 4 may be fixed. Inside the top of the head 2 there is an air-chamber 10 the diameter of which is preferably slightly greater than that of the tube 1 so that the end of the latter which may be provided with two diametrically opposite grooves 5 may project a short distance into said chamber in order that the outer ends of said grooves may not be closed by the wall of the chamber. The end of the head is provided with an entrance and exit hole 6 and with two diametrically opposite grooves 7 and with two lateral grooves 8 formed by removing parts of the screw-threads. Inside the air-chamber a member 9 in the form of a loose bent disk is permanently contained which serves as a baffling-means for the purpose above-described. The object of employing a bent disk is to prevent said disk from closing either the top of the tube 5 or the hole 7 when the tube is inclined or inverted.

The mode of operation of the apparatus is as follows:—The measuring-tube 1 with the cap 3 in position as shown in Fig. 1 is lowered in the well-known manner into the water the depth of which is to be measured, by inclosing it in a guard-tube lashed to a sounding line at the end of which is attached a sinker. As the measuring-tube descends the water-pressure increases and water is forced up between the cap 3 and the head 2, and up the grooves 8, and along the screw-threads into the grooves 7 and then through the hole 6 into the air-chamber and thence into the tapering tube. After reaching the bottom the apparatus is immediately raised. While it is rising the air within it expands and on passing out of the top of the tapering tube, together with any water which it may carry with it, strikes the baffling member 9 which deflects the water back into the tapering tube while the air escapes around its edges or through small holes with which it may be provided. The air then passes through the hole 6 and back along the path above-described. After the instrument has been raised to the top, the height of the water in the tube may be read off on the scale indicating the depth, or the depth corresponding to the amount of water be ascertained in any other suitable manner. Finally, the water is shaken out of the tube and the operation of sounding may be repeated.

It is obvious that many different kinds of baffling-means may be employed in accordance with the present invention and be arranged in various ways, the baffling disk illustrated being merely one example of such means, and the arrangement shown one of such ways.

What I claim as my invention and desire to secure by Letters Patent is:—

1. In a depth-recorder of the type described the combination with a vessel having a channel serving during the descent of the recorder as an entrance channel for the water and during the ascent as an exit channel for the air, of non-submergible baffling-means arranged permanently and directly in said channel for baffling the escaping air and any water carried therewith for the purpose of deflecting such water back into the vessel while permitting the air to escape.

2. In a depth-recorder of the type described the combination with a vessel having a channel serving during the descent of the recorder as an entrance channel for the water and during the ascent as an exit channel for the air and a chamber in the course of said channel, of loose non-submergible baffling means arranged permanently in said chamber for baffling the escaping air and any water carried therewith for the purpose of deflecting such water back into the vessel while permitting the air to escape.

3. In a depth-recorder of the type described the combination with a vessel having a channel serving during the descent of the recorder as an entrance channel for the water and during the ascent as an exit channel for the air, and a chamber in the course of said channel, of a loose disk arranged permanently in said chamber for baffling the escaping air and any water carried therewith for the purpose of deflecting such water back into the vessel while permitting the air to escape.

4. In a depth recorder of the type described the combination with a vessel having a channel serving during the descent of the recorder as an entrance channel for the water and during the ascent as an exit channel for the air and a chamber in the course of said channel, of a loose bent disk arranged permanently in said chamber for baffling the escaping air and any water carried therewith for the purpose of deflecting such water back into the vessel while permitting the air to escape.

5. A depth-recorder comprising in combination the tube 1 provided with the head 2 having the air chamber 10 and the entrance and exit hole 6, the bent disk 9 arranged permanently in said chamber, and the cap 3.

In testimony whereof I have signed my name to this specification in the presence of two subscribing witnesses.

JOHN WILSON GILLIE.

Witnesses:
   JAMES MEIRS,
   AMY DORA TODD.